Nov. 24, 1953   L. GLASS ET AL   2,660,715
TRACTOR SAFETY CONTROL MEANS
Filed June 27, 1952   2 Sheets—Sheet 1
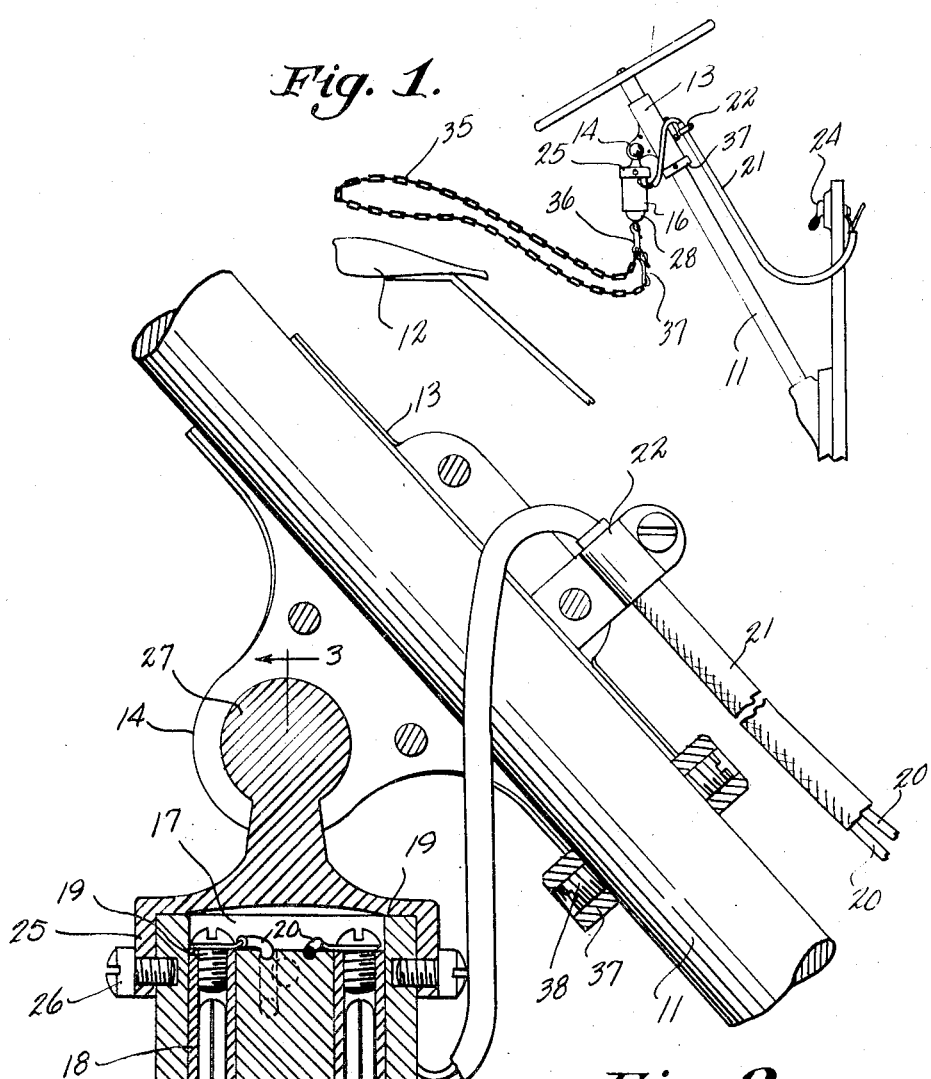
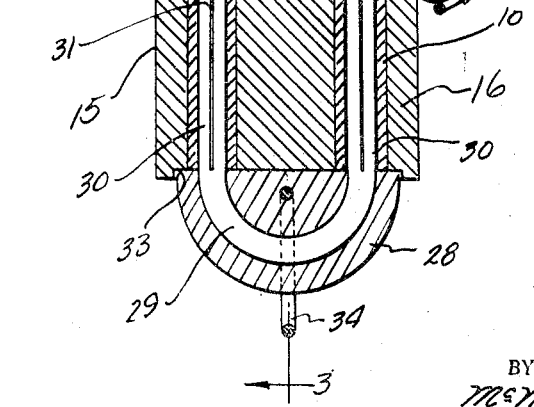
INVENTORS
LOYD GLASS,
BERT G. PURTLE,
BY
McMorrow, Berman & Davidson
ATTORNEYS Nov. 24, 1953  L. GLASS ET AL  2,660,715
TRACTOR SAFETY CONTROL MEANS
Filed June 27, 1952  2 Sheets-Sheet 2

INVENTORS
LOYD GLASS,
BERT G. PURTLE,
BY
McMorrow, Berman + Davidson
ATTORNEYS

Patented Nov. 24, 1953

2,660,715

UNITED STATES PATENT OFFICE 2,660,715

TRACTOR SAFETY CONTROL MEANS

Loyd Glass, Canton, and Bert G. Purtle, Elmwood, Ill.

Application June 27, 1952, Serial No. 296,032

2 Claims. (Cl. 339—19)

This invention relates to safety devices for motor vehicles, and more particularly to an improved means for automatically stopping a tractor when the driver thereof is accidentally thrown from the operating seat of the tractor.

A main object of the invention is to provide a novel and improved safety device for motor vehicles arranged to stop the vehicle when the driver is accidentally thrown from the operating seat thereof, the improved device being simple in construction, being easy to install, and providing a means of stopping a vehicle such as a tractor when the operator is accidentally thrown from the driver's seat thereof, thereby preventing injury to the operator.

A further object of the invention is to provide an improved safety control device for a tractor, said control device involving inexpensive components, being rugged in construction, and being compact in size, whereby it may be easily attached to a portion of a tractor without interfering with normal operation of the tractor.

Further objects and advantages of the invention will become apparent from the following description and claims, and from the accompanying drawings, wherein:

Figure 1 is a fragmentary side elevational view of portions of a tractor, including the tractor steering wheel and the driver's seat thereof, showing an improved safety device according to the present invention installed thereon.

Figure 2 is an enlarged vertical cross sectional view taken through the safety device shown in Figure 1.

Figure 3:
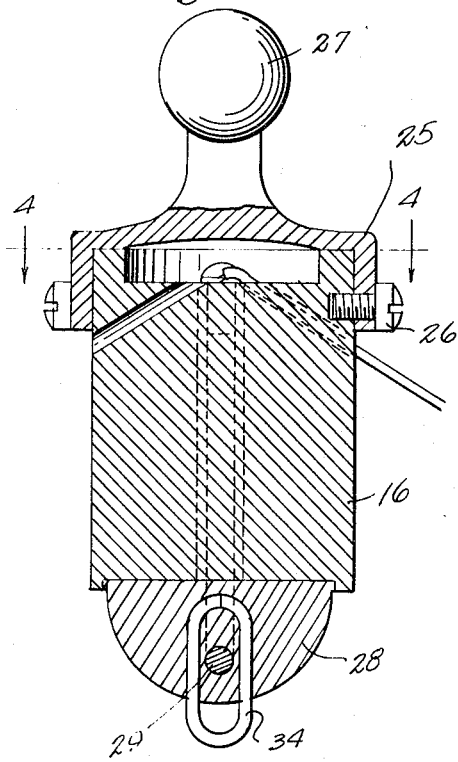
Figure 3 is a cross sectional view taken on the line 3—3 of Figure 2.

Referring to the drawings, 11 designates the steering post of a tractor and 12 designates the operator's seat. Secured to the upper portion of the steering post 11 is a sleeve member 13 formed with a ball socket 14. Designated at 15 is the main body of the improved safety device, said main body comprising a cylindrical member 16 of insulating material formed with a recess 17 in its upper portion and having embedded therein the tubular sleeve-like terminal members 18, 18. Threadedly engaged in the top ends of the terminal members 18 are the respective terminal screws 19, 19 to which are respectively connected the wires 20, 20 forming part of a cable 21 which is clamped at 22 to the sleeve member 13. The wires 20, 20 are adapted to be connected in the ignition circuit of the tractor, in series with the ignition switch 24 of the tractor, as show in Figure 1. Designated at 25 is an annular cap member engageable over the top end of the cylindrical member 16 and being secured to said cylindrical member by the bolts 26 extending through apertures in the annular flange of the member 25 and threadedly engaged in the cylindrical member 16. The cap member 25 is formed integrally with the pivot ball 27 which is rotatably housed in the ball socket 14, thus pivoting the member 16 to the bracket 13 for universal rotation with respect thereto.

Figure 5:
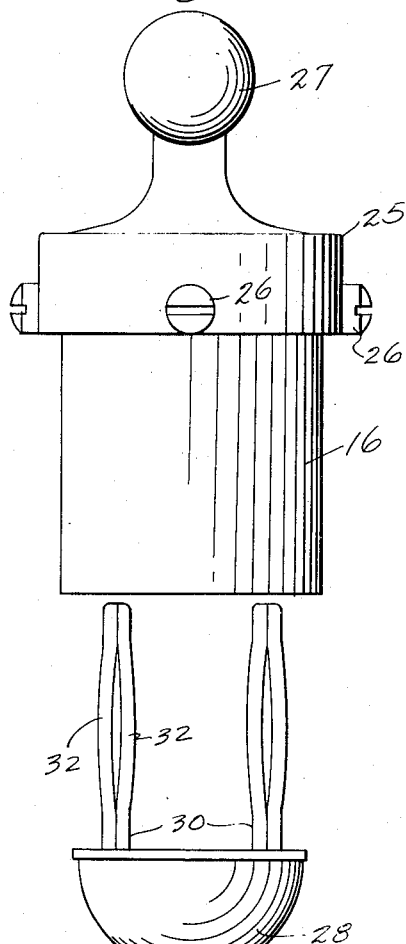
Figure 5 is a side elevational view of the safety device showing the terminal-bridging contact member withdrawn from the body of the device.
Figure 4:
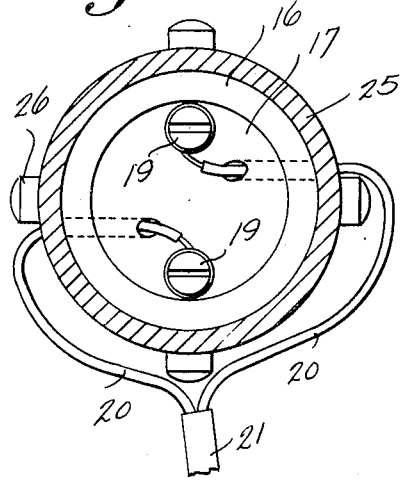
Figure 4 is a cross sectional view taken on the line 4—4 of Figure 3.

Designated at 28 is a hemispherical body of insulating material which has molded therein the U-shaped bridging contact member 29, the arms of the member 29 being shown at 30, 30. The arms 30, 30 are split longitudinally, as shown at 31, and the segments of said arms are bowed outwardly, as shown at 32, 32 in Figure 5, whereby the outwardly bowed segments 32, 32 will exert a frictional yieldable binding action in the sleeves 18, 18 when the arms are inserted in said sleeves, in the manner shown in Figure 2. The bottom end of the cylindrical body 16 is recessed, as shown at 33 to receive the marginal portion of the hemispherical body 28, and to provide a substantially moisture-tight seal therewith.

Molded in the hemispherical body 28 transversely to the bight portion of the bridging contact member 29 and spaced therefrom is the substantially oval chain link 34 which projects from the bottom of the hemispherical member 28, as shown in Figures 2 and 3. Designated at 35 is a loop of chain or other suitable flexible material which is connected to the link 34, as by means of the conventional chain connector 36, one end of the loop 35 being provided with the detachable hook 37. As shown in Figure 1, the loop 35 is arranged so that it may be disposed around the body of the driver of the tractor when the driver is occupying the driver's seat 12. Under these conditions, if the driver should be accidentally thrown from the seat 12, the weight of the driver's body will be transmitted through the chain loop 35 to the link 34 and to the hemispherical member 28, causing said hemispherical member to be detached from the body 16 and causing the contact arms 30 to be withdrawn from the terminal sleeves 18. This opens the ignition circuit of the tractor and causes the tractor to stop, thus preventing injury to the driver of the tractor.

As shown in Figure 2, the sleeve member 13 is supported on the steering post 11 by engagement with an adjustable collar 37 which may be clamped to any desired portion of the steering post 11, the collar 37 being provided with the set screws 38 for clampingly securing the collar in adjusted position on the steering post.

The pivotal connection provided by the ball 27 and the ball socket 14 allows the safety device to be rotated freely and allows the operator of the vehicle to perform normal body movements, whereby the safety device does not interfere in any way with the normal activities of the driver.

While a specific embodiment of an improved safety device for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a safety switch, a bracket adapted to be secured to a support, an insulated body mounted on said bracket, a pair of sleeve conductors within said body having open ends exposed at one end of said body, an insulated block having an end engaged with said one end of said body, a bridging conductor within said block having resilient compressible arms projecting from said end of the block, and arms being compressed and frictionally engaged in said sleeves, said sleeve being connectible in an electric circuit, and means on said block for connection of a pull loop thereto for withdrawing the block from said body and the bridging conductor arms from said sleeves and breaking the circuit.

2. In a safety switch, a bracket adapted to be secured to a support, an insulated body mounted on said bracket, a pair of sleeve conductors within said body having open ends exposed at one end of said body, an insulated block having an end engaged with said one end of said body, a bridging conductor within said block having resilient compressible arms projecting from said end of the block, and arms being compressed and frictionally engaged in said sleeves, said sleeve being connectible in an electric circuit, and means on said block for connection of a pull loop thereto for withdrawing the block from said body and the bridging conductor arms from said sleeves and breaking the circuit, and pivot means pivotally connecting the other end of said body with said bracket and providing for adjusting the position of said body in the direction of anticipated pull on said pull loop.

LOYD GLASS.
BERT G. PURTLE.

References Cited in the file of this patent

UNITED STATES PATENTS

| Number | Name | Date |
|---|---|---|
| 267,747 | Gilliland | Nov. 21, 1882 |
| 1,988,330 | Pettersson | Jan. 15, 1935 |
| 2,030,522 | Johansson | Feb. 11, 1936 |